United States Patent [19]
Yahagi

[11] Patent Number: 5,548,445
[45] Date of Patent: Aug. 20, 1996

[54] ZOOM LENS SYSTEM

[75] Inventor: Satoshi Yahagi, Saitama-ken, Japan

[73] Assignee: Fuji Photo Optical Co., Ltd., Saitama-ken, Japan

[21] Appl. No.: 398,687

[22] Filed: Mar. 6, 1995

[30]     Foreign Application Priority Data

Mar. 22, 1994 [JP] Japan .................................. 6-050334

[51] Int. Cl.$^6$ ........................... G02B 15/15; G02B 15/14
[52] U.S. Cl. ........................ 359/677; 359/683; 359/684
[58] Field of Search ..................................... 359/683, 684, 359/677

[56]               References Cited
              U.S. PATENT DOCUMENTS 5,299,064  3/1994  Hamano et al. ..................... 359/684

*Primary Examiner*—Georgia Y. Epps
*Assistant Examiner*—Evelyn A. Lester
*Attorney, Agent, or Firm*—Sixbey, Friedman, Leedom & Ferguson, P.C.; Gerald J. Ferguson, Jr.; Evan R. Smith

[57]                 ABSTRACT

A zoom lens system consists of a positive first lens group G1, a negative second lens group G2, a stop, a positive third lens group G3, a positive fourth lens group G4 and a positive fifth lens group G5 arranged in this order from the object side. The second and fourth lens groups G2 and G4 are moved with the other lens groups G1, G3 and G5 fixed when zooming. The focal length of the total lens system is changed by moving the second lens group G2 along the optical axis and the change in the image-forming position generated by the movement of the second lens group G2 is compensated for and the zoom lens system is focused by moving the fourth lens group G4 along the optical axis.

The following formulae (1) and (2) are satisfied, $$1.1 < f_{w(G4+G5)}/(f_w \cdot f_t)^{1/2} < 1.3 \qquad (1)$$

$$1.2 < f_{G3}/(f_w \cdot f_t)^{1/2} < 1.8 \qquad (2)$$

wherein $f_{w(G4+G5)}$ represents the combined focal length of the fourth and fifth lens groups G4 and G5 at the wide-side end, $f_w$ represents the focal length of the total lens system at the wide-side end, $f_t$ represents the focal length of the total lens system at the tele-side end and $f_{G3}$ represents the focal length of the third lens group G3.

4 Claims, 8 Drawing Sheets

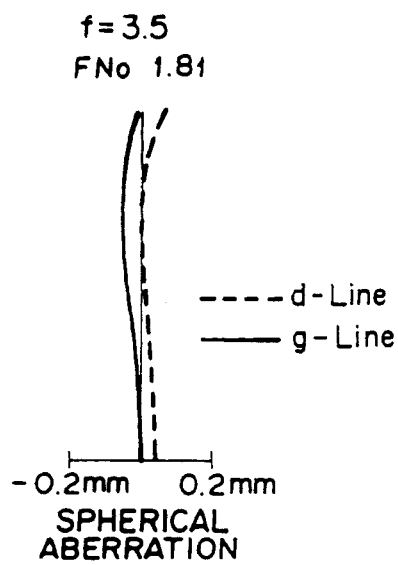
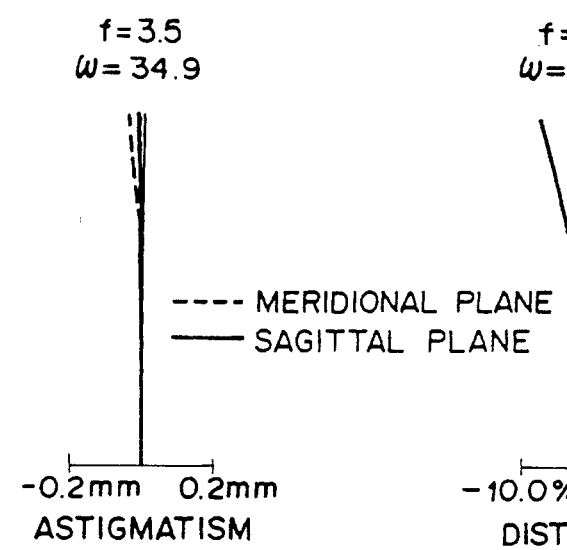
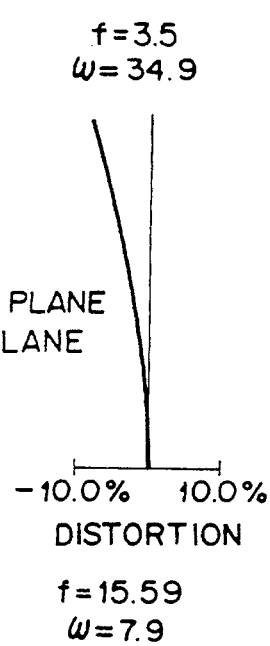
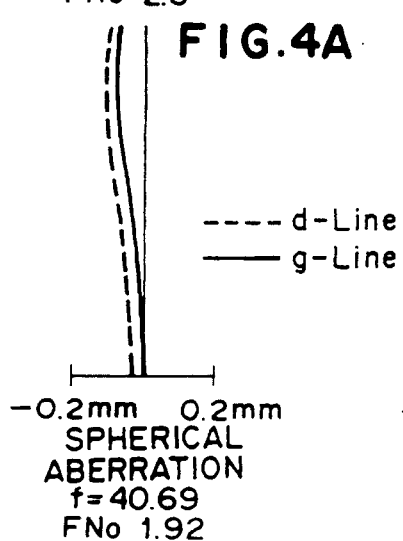
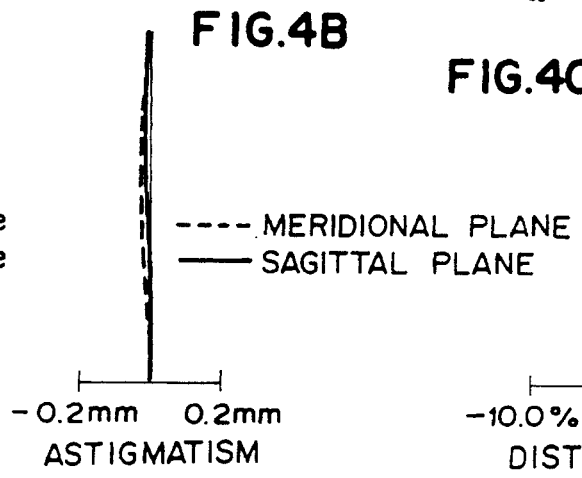
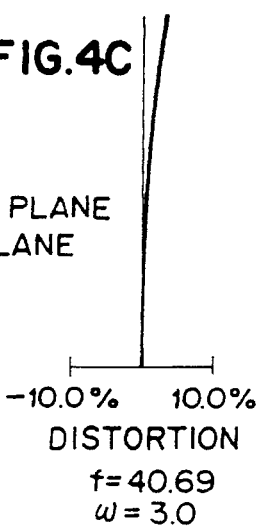
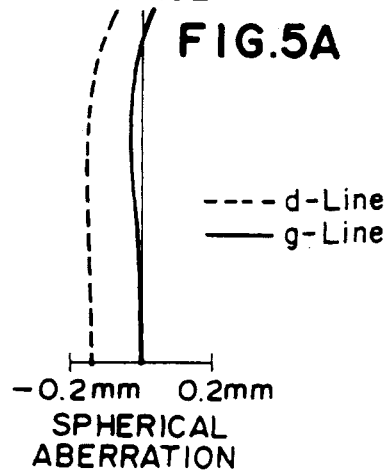
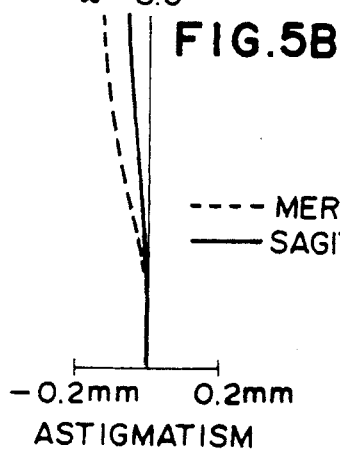
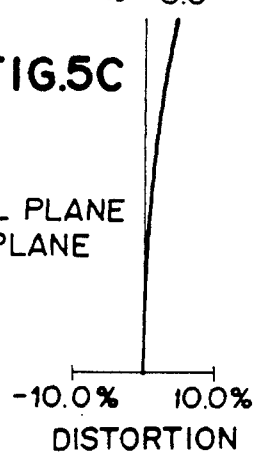

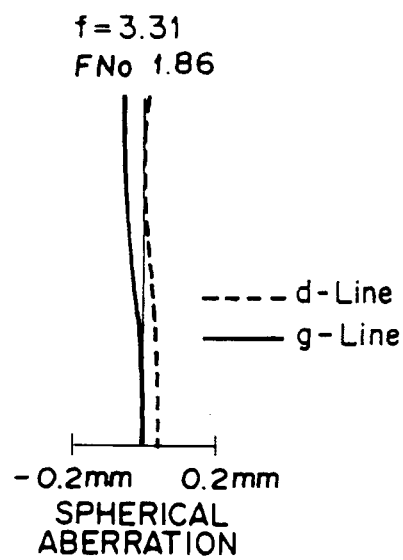

FIG.6A f=3.31
FNo 1.86

---- d-Line
—— g-Line

-0.2mm  0.2mm
SPHERICAL ABERRATION

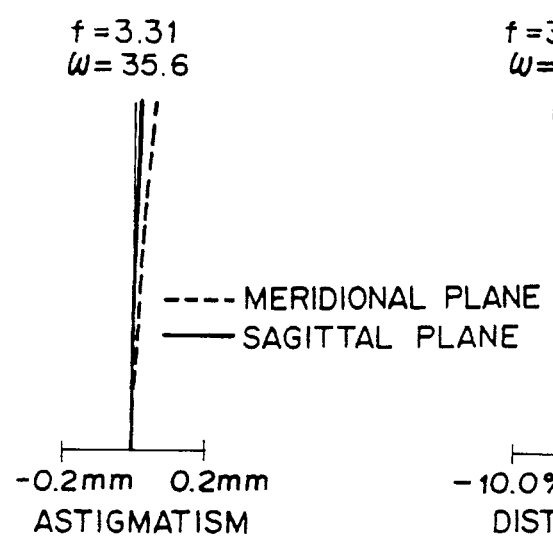

FIG.6B f=3.31
ω=35.6

---- MERIDIONAL PLANE
—— SAGITTAL PLANE

-0.2mm  0.2mm
ASTIGMATISM

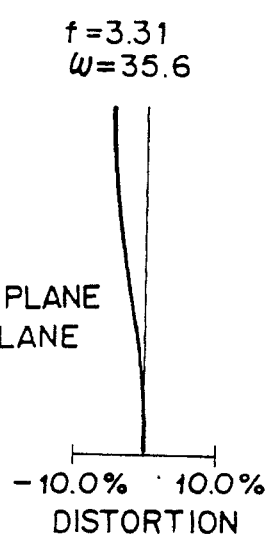

FIG.6C f=3.31
ω=35.6

-10.0%  10.0%
DISTORTION

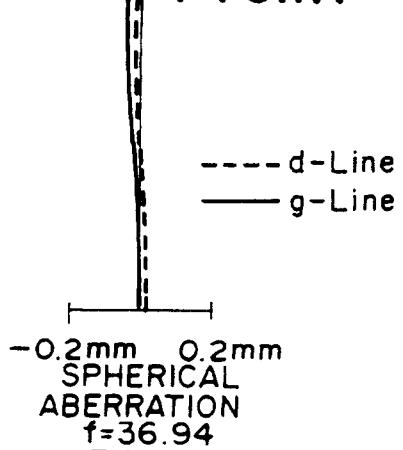

f=14.17
FNo 2.32

FIG.7A

---- d-Line
—— g-Line

-0.2mm  0.2mm
SPHERICAL ABERRATION

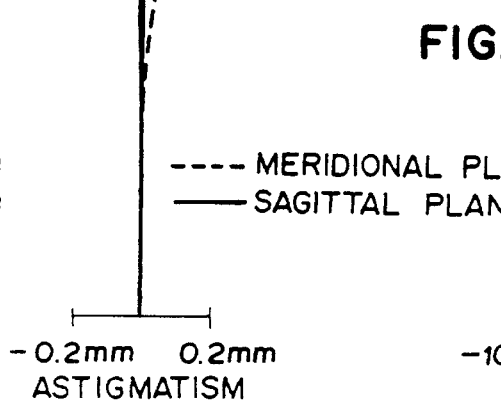

---- MERIDIONAL PLANE
—— SAGITTAL PLANE

-0.2mm  0.2mm
ASTIGMATISM

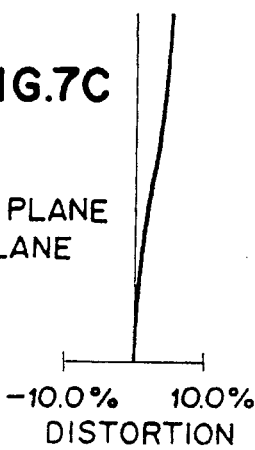

-10.0%  10.0%
DISTORTION

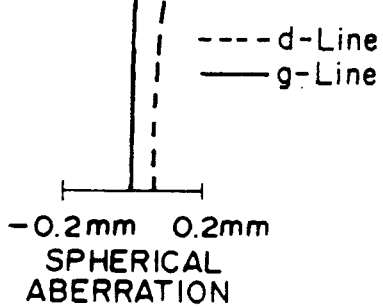

f=36.94
FNo 2.01

FIG.8A

---- d-Line
—— g-Line

-0.2mm  0.2mm
SPHERICAL ABERRATION

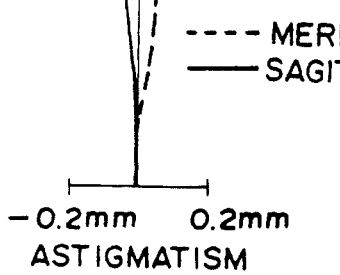

---- MERIDIONAL PLANE
—— SAGITTAL PLANE

-0.2mm  0.2mm
ASTIGMATISM

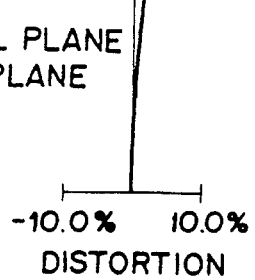

-10.0%  10.0%
DISTORTION

FIG.9A
f = 3.51
FNo 1.83

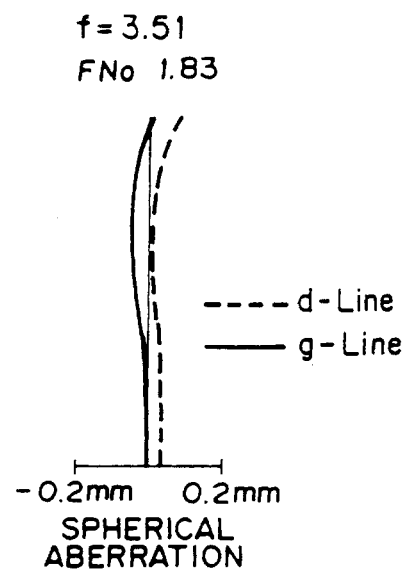

---- d-Line
—— g-Line

-0.2mm  0.2mm
SPHERICAL
ABERRATION

FIG.9B
f = 3.51
ω = 35.0

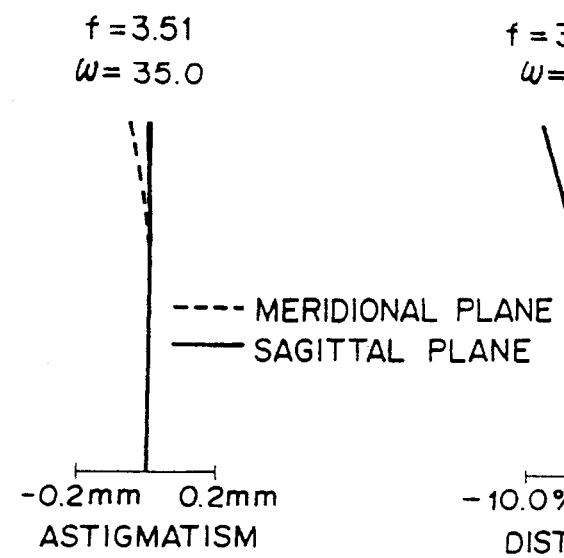

---- MERIDIONAL PLANE
—— SAGITTAL PLANE

-0.2mm  0.2mm
ASTIGMATISM

FIG.9C
f = 3.51
ω = 35.0

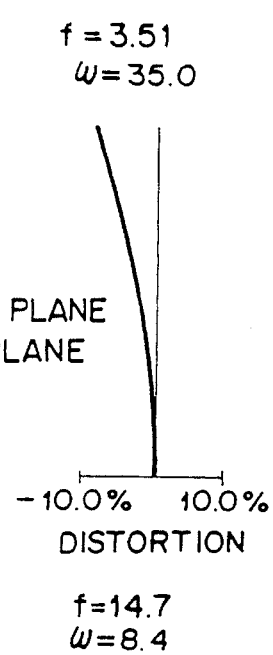

-10.0%  10.0%
DISTORTION

--- f = 14.7
FNo 2.27

FIG.10A

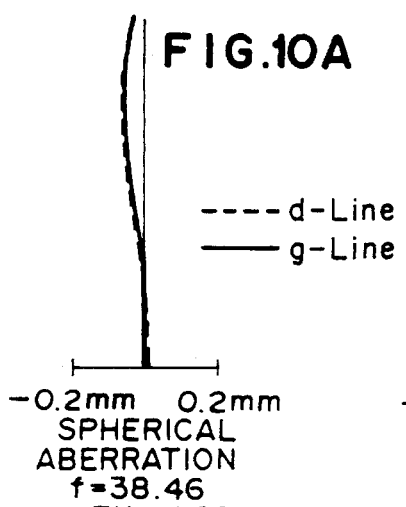

---- d-Line
—— g-Line

-0.2mm  0.2mm
SPHERICAL
ABERRATION f = 14.7
ω = 8.4

FIG.10B

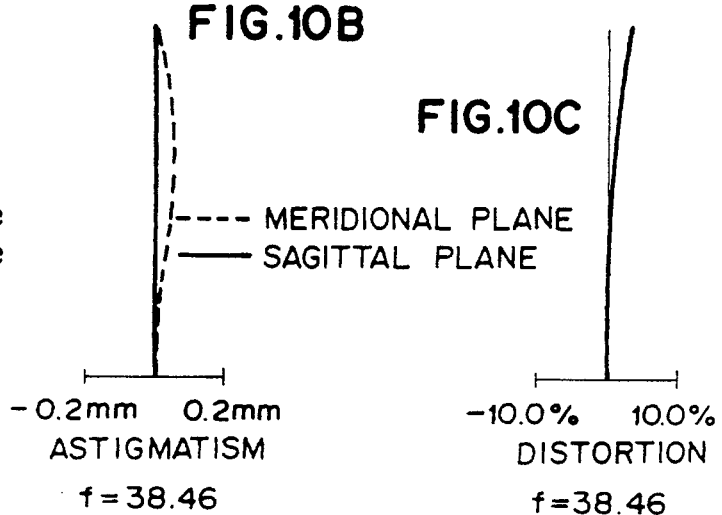

---- MERIDIONAL PLANE
—— SAGITTAL PLANE

-0.2mm  0.2mm
ASTIGMATISM f = 14.7
ω = 8.4

FIG.10C

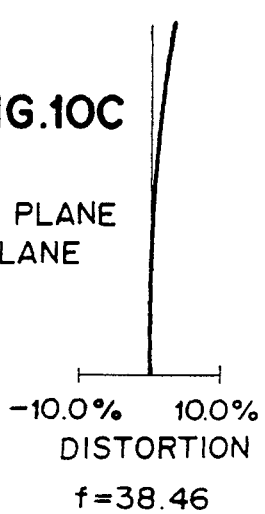

-10.0%  10.0%
DISTORTION

--- f = 38.46
FNo 1.88

FIG.11A

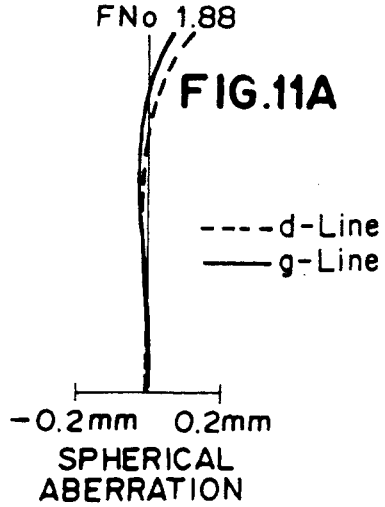

---- d-Line
—— g-Line

-0.2mm  0.2mm
SPHERICAL
ABERRATION f = 38.46
ω = 3.2

FIG.11B

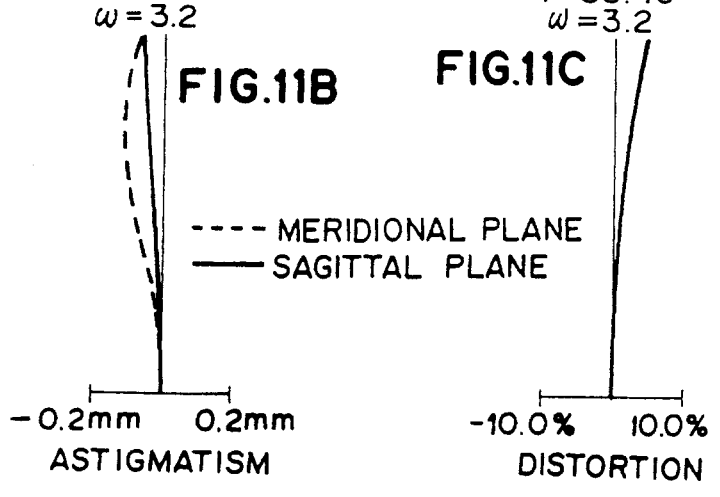

---- MERIDIONAL PLANE
—— SAGITTAL PLANE

-0.2mm  0.2mm
ASTIGMATISM f = 38.46
ω = 3.2

FIG.11C

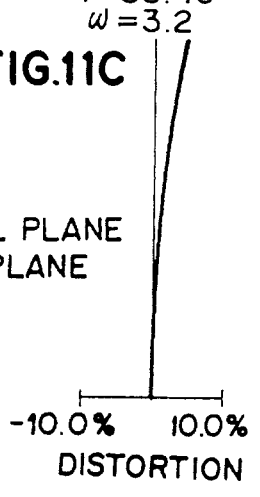

-10.0%  10.0%
DISTORTION

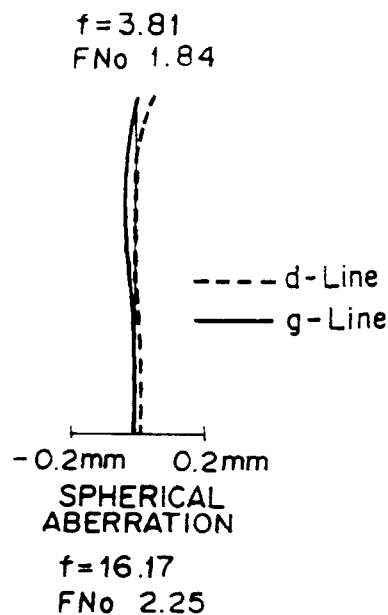
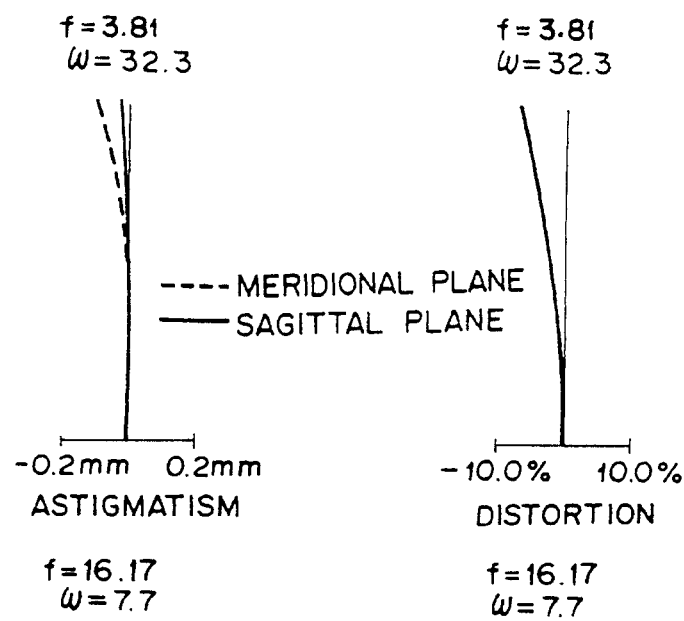

FIG.12A f=3.81 FNo 1.84 — d-Line, g-Line — −0.2mm 0.2mm SPHERICAL ABERRATION

FIG.12B f=3.81 ω=32.3 — MERIDIONAL PLANE, SAGITTAL PLANE — −0.2mm 0.2mm ASTIGMATISM

FIG.12C f=3.81 ω=32.3 — −10.0% 10.0% DISTORTION

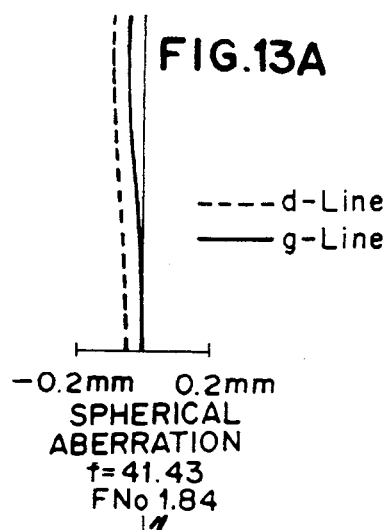
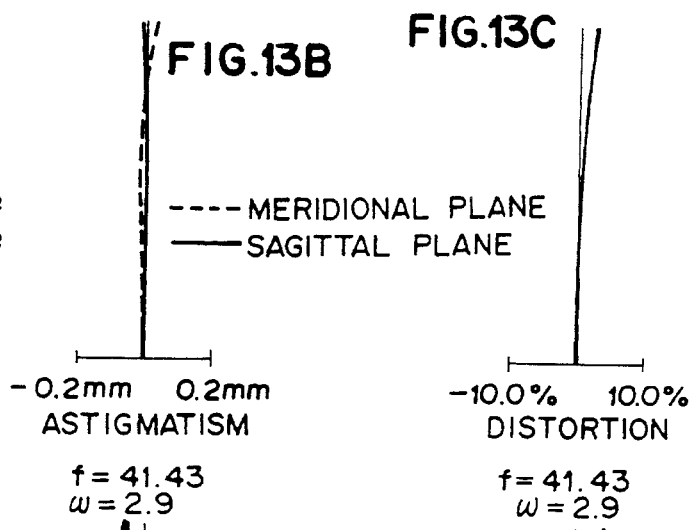

FIG.13A f=16.17 FNo 2.25 — d-Line, g-Line — −0.2mm 0.2mm SPHERICAL ABERRATION

FIG.13B f=16.17 ω=7.7 — MERIDIONAL PLANE, SAGITTAL PLANE — −0.2mm 0.2mm ASTIGMATISM

FIG.13C f=16.17 ω=7.7 — −10.0% 10.0% DISTORTION

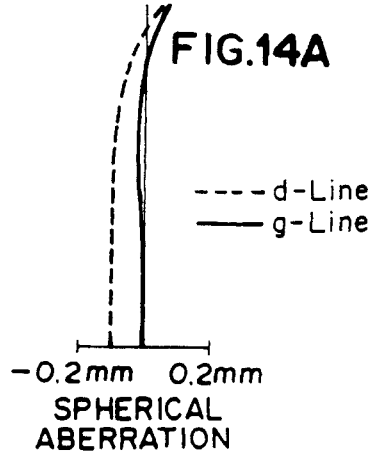
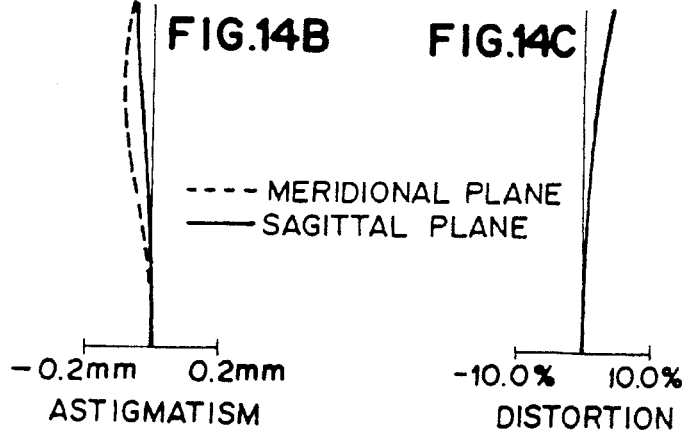

FIG.14A f=41.43 FNo 1.84 — d-Line, g-Line — −0.2mm 0.2mm SPHERICAL ABERRATION

FIG.14B f=41.43 ω=2.9 — MERIDIONAL PLANE, SAGITTAL PLANE — −0.2mm 0.2mm ASTIGMATISM

FIG.14C f=41.43 ω=2.9 — −10.0% 10.0% DISTORTION

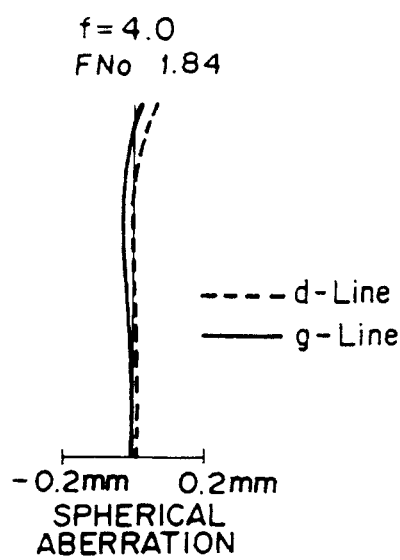
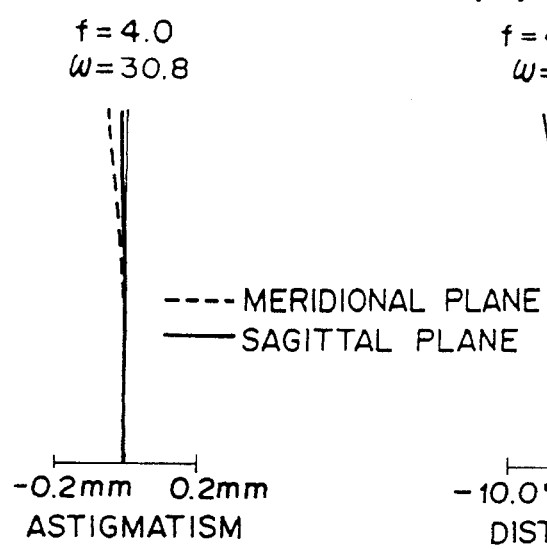
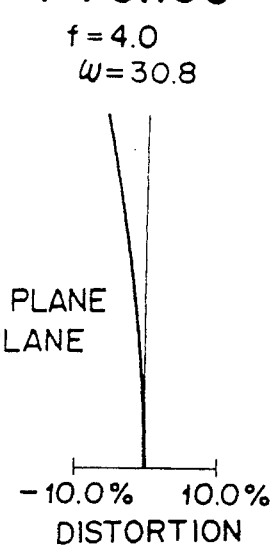

FIG.15A f=4.0 FNo 1.84 — d-Line, g-Line; −0.2mm 0.2mm SPHERICAL ABERRATION

FIG.15B f=4.0 ω=30.8 — MERIDIONAL PLANE, SAGITTAL PLANE; −0.2mm 0.2mm ASTIGMATISM

FIG.15C f=4.0 ω=30.8; −10.0% 10.0% DISTORTION

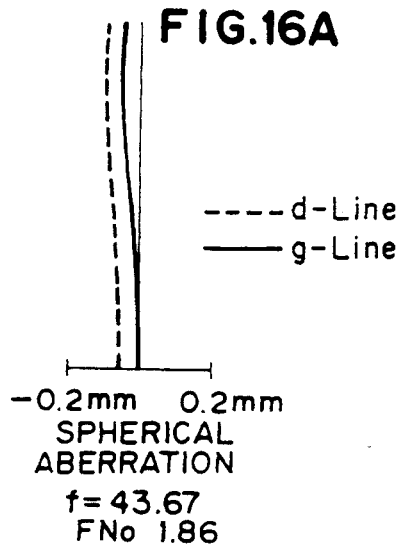
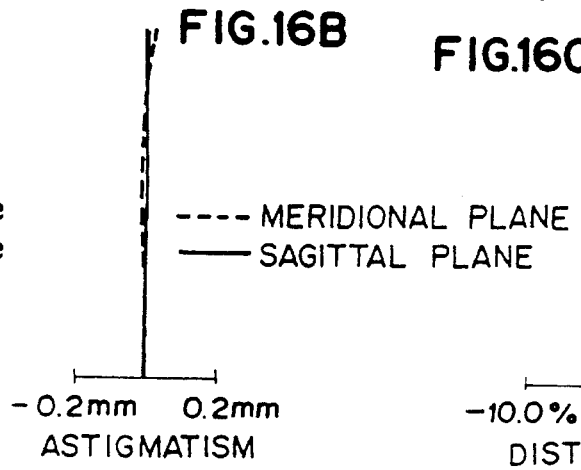
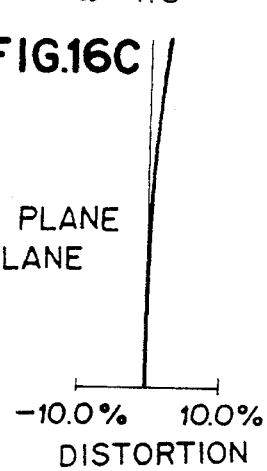

FIG.16A f=17.03 FNo 2.31 — d-Line, g-Line; −0.2mm 0.2mm SPHERICAL ABERRATION

FIG.16B f=17.03 ω=7.3 — MERIDIONAL PLANE, SAGITTAL PLANE; −0.2mm 0.2mm ASTIGMATISM

FIG.16C f=17.03 ω=7.3; −10.0% 10.0% DISTORTION

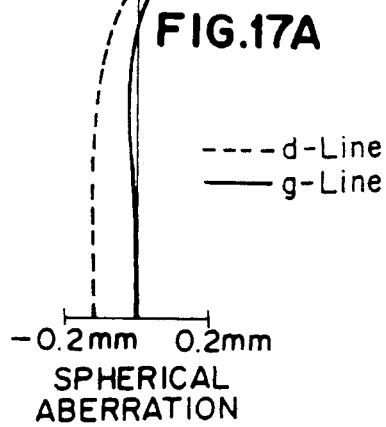
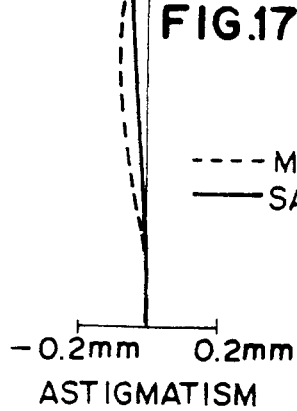
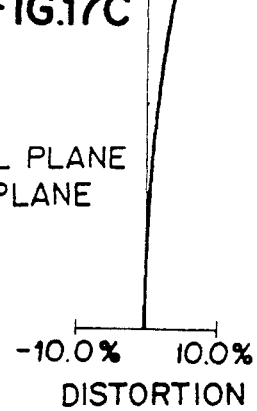

FIG.17A f=43.67 FNo 1.86 — d-Line, g-Line; −0.2mm 0.2mm SPHERICAL ABERRATION

FIG.17B f=43.67 ω=2.8 — MERIDIONAL PLANE, SAGITTAL PLANE; −0.2mm 0.2mm ASTIGMATISM

FIG.17C f=43.67 ω=2.8; −10.0% 10.0% DISTORTION

FIG. 18A
f = 3.5
FNo 1.82

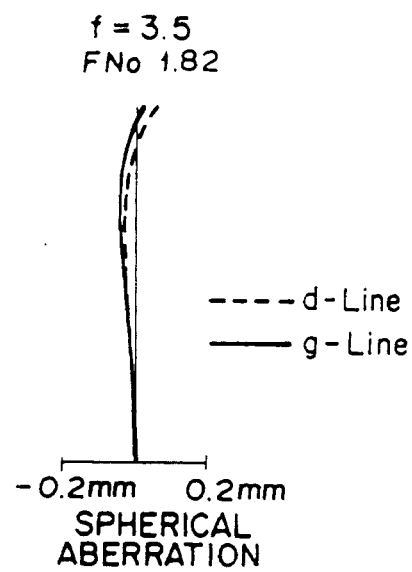

---- d-Line
——— g-Line

-0.2mm 0.2mm
SPHERICAL
ABERRATION

FIG. 18B
f = 3.5
ω = 35.0

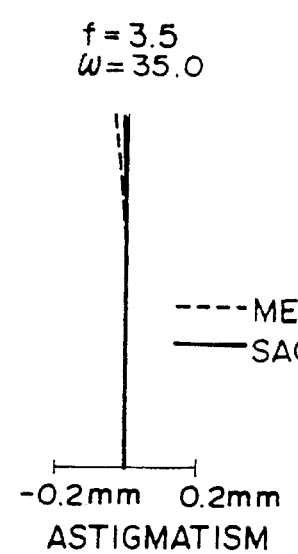

---- MERIDIONAL PLANE
——— SAGITTAL PLANE

-0.2mm 0.2mm
ASTIGMATISM

FIG. 18C
f = 3.5
ω = 35.0

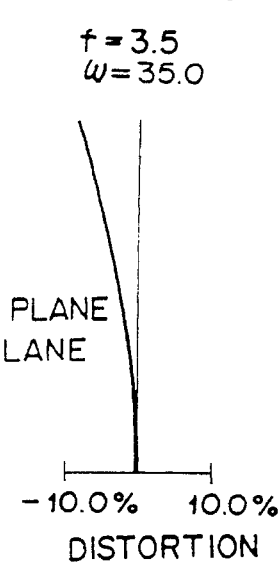

-10.0% 10.0%
DISTORTION

FIG. 19A
f = 15.59
FNo 2.3

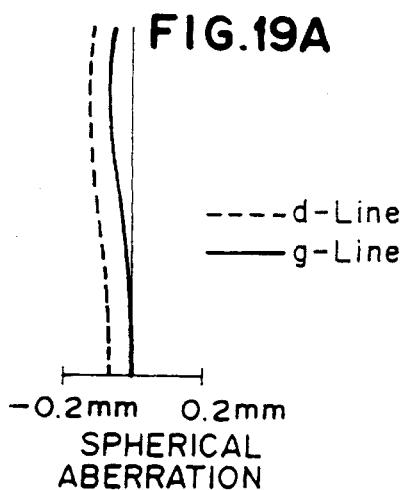

---- d-Line
——— g-Line

-0.2mm 0.2mm
SPHERICAL
ABERRATION

FIG. 19B
f = 15.59
ω = 7.9

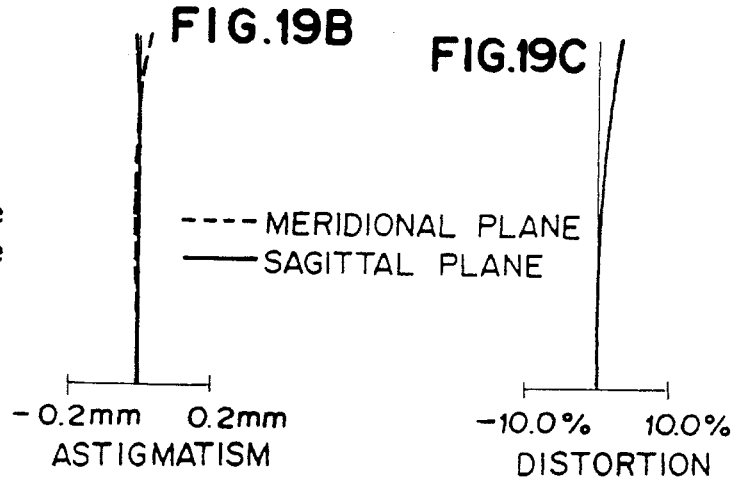

---- MERIDIONAL PLANE
——— SAGITTAL PLANE

-0.2mm 0.2mm
ASTIGMATISM

FIG. 19C
f = 15.59
ω = 7.9

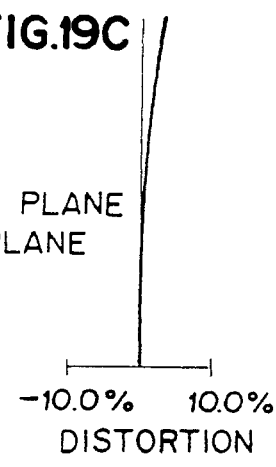

-10.0% 10.0%
DISTORTION

FIG. 20A
f = 40.76
FNo 1.92

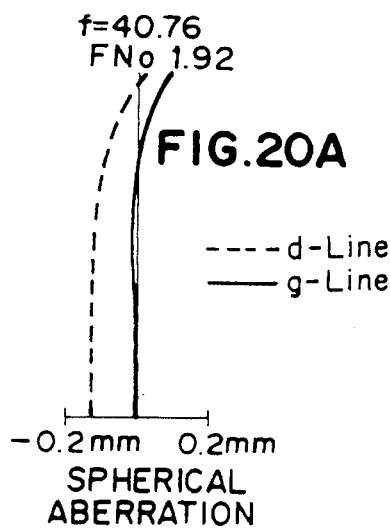

---- d-Line
——— g-Line

-0.2mm 0.2mm
SPHERICAL
ABERRATION

FIG. 20B
f = 40.76
ω = 3.0

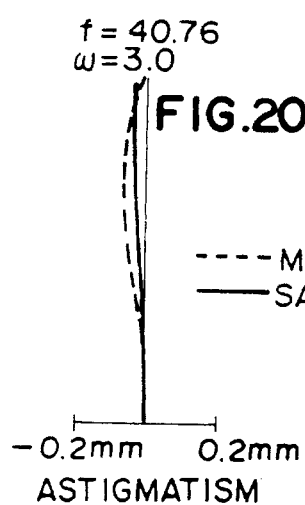

---- MERIDIONAL PLANE
——— SAGITTAL PLANE

-0.2mm 0.2mm
ASTIGMATISM

FIG. 20C
f = 40.76
ω = 3.0

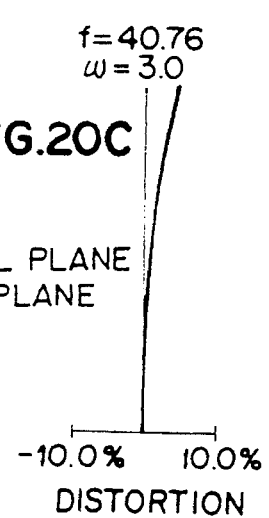

-10.0% 10.0%
DISTORTION

ZOOM LENS SYSTEM

BACKGROUND OF THE INVENTION

1. Field of the Invention

This invention relates to a zoom lens system, and more particularly to a zoom lens system #or a home video camera or an electronic still camera.

2. Description of the Prior Art

In a video camera, the image taking size is being reduced to ¼ inches from ⅓ inches, and an attempt simplify the structure of the zoom lens system and reduce the number of the lens elements in the zoom lens system has been made in order to miniaturize the zoom lens system for a video camera in response to reduction in the image taking size. For example, the majority of known zoom lens systems having an F-number of 1.6 to 1.8 and a zoom ratio of ×8 to ×10 consist of four lens groups, the first and third lens groups being fixed and the second and fourth lens groups being movable. In such zoom lens systems, the lens system is zoomed by moving the second lens group in the direction of the optical axis and change in the image-forming position generated by the movement of the second lens group is compensated for moving the fourth lens group in the direction of the optical axis.

However the four lens group zoom lens systems are disadvantageous in the following point. That is, when the zoom lens system is zoomed from the wide-side end to the tele-side end or from the tele-side end to the wide-side end, the fourth lens group is fed forward (toward the object) and then fed rearward. Accordingly in a middle focal length range, the fourth lens group is positioned close to the third lens group and light bundles traveling toward peripheral portions of an image emanate from the fourth lens group at a relatively small distance from the optical axis of the fourth lens group. As a result, aberrations in the middle focal length range differ from those in the range near the wide-side end or the tele-side end and it is difficult to suppress fluctuation in aberrations over the entire focal length range.

When the refracting power of the fourth lens group is increased in order to shorten the focal length at the wide-side end and enlarge the angle of view, the distance of movement of the fourth lens group is shortened and the overall size of the lens system is reduced. However it increases fluctuation in aberrations generated by movement of the fourth lens group and makes it further difficult to compensate for aberrations over the entire focal length range.

In order to increase the zoom ratio, it is necessary to increase the distance of movement of the fourth lens group as well as that of the second lens group, and when the distance of movement of the fourth lens group is increased, the fluctuation in aberrations is increased and it becomes difficult to compensate for aberrations over the entire focal length range.

In U.S. Pat. No. 5,299,064, there is disclosed a five lens group zoom lens system in which aberrations are compensated for over the entire focal length range. The five lens group zoom lens system consists of a positive first lens group, a negative second lens group, a positive third lens group, a positive fourth lens group and a negative fifth lens group, the second and fourth lens groups being movable and the other lens groups being fixed. In the zoom lens system, aberrations are compensated for over the entire focal length range and the size of the overall lens system is reduced by limiting the focal length and the like of the second lens group within a predetermined range, and the zoom ratio and the F-number of the zoom lens system are about ×8 to ×10 and about 2.0, respectively. Further the zoom lens system is zoomed by moving the second and fourth lens groups and is focused by moving the fourth lens group.

However in either of the aforesaid four lens group and five lens group zoom lens systems, the angle of view is 58° at most and the zoom ratio is ×10 at most. There is an increasing demand for a zoom lens system having a larger angle of view and a larger zoom ratio.

SUMMARY OF THE INVENTION

In view of the foregoing observations and description, the primary object of the present invention is to provide a zoom lens system having a larger angle of view at the wide-side end, a larger zoom ratio and a higher optical performance.

The zoom lens system of the present invention comprises a first lens group G1 having a positive refracting power, a second lens group G2 having a negative refracting power, a stop, a third lens group G3 having a positive refracting power, a fourth lens group G4 having a positive refracting power and a fifth lens group G5 having a positive refracting power arranged in this order from the object side, the second and fourth lens groups G2 and G4 being moved with the other lens groups G1, G3 and G5 fixed when zooming, the second lens group G2 being moved in the direction of the optical axis to change the focal length of the total lens system, the fourth lens group G4 being moved to correct the image-forming position, the following formulae (1) and (2) being satisfied, $$1.1 < f_{w(G4+G5)}/(f_w \cdot f_t)^{1/2} < 1.3 \tag{1}$$

$$1.2 < f_{G3}/(f_w \cdot f_t)^{1/2} < 1.8 \tag{2}$$

wherein $f_{w(G4+G5)}$ represents the combined focal length of the fourth and fifth lens groups G4 and G5 at the wide-side end, $f_w$ represents the focal length of the total lens system at the wide-side end, $f_t$ represents the focal length of the total lens system at the tele-side end and $f_{G3}$ represents the focal length of the third lens group G3.

When at least one of the faces of the lens elements in the third lens group G3 is an aspheric surface, aberrations can be better compensated for.

The fifth lens group G5 may consist of a lens element having a positive refracting power and a lens element having a negative refracting power. When a pair of lens elements which greatly differ from each other in dispersion are used, compensation for lateral chromatic aberration over the entire focal length range is facilitated. It is preferred that the Abbe's number $v_+$ of the lens element having a positive refracting power and the Abbe's number $v_-$ of the lens element having a negative refracting power satisfy the following formulae (3) and (4).

$$v_+ > 55 \tag{3}$$

$$v_- < 35 \tag{4}$$

In the zoom lens system of the present invention, by virtue of the fifth lens group which has a positive refracting power and is held stationary when zooming, the angle of view can be enlarged up to 60° to 70° without increasing the refracting power of the fourth lens group and accordingly without increasing fluctuation in aberrations generated in response to zooming can be minimize. Further the zoom ratio can be as large as ×10 to ×12.

The formula (1) limits the refracting power of the fourth and fifth lens groups in order to enlarge the angle of view at the wide-side end. In order to enlarge the angle of view while compensating for aberrations over the entire focal length range, the formula (1) should be satisfied.

That is, when $f_{w(G4+G5)}/(f_w \cdot f_t)^{1/2}$ is not smaller than the upper limit, the curvature of field is excessively compensated from and it becomes difficult to balance the curvature of field with the spherical aberration though the angle of view is further enlarged at the wide-side end. On the other hand, when $f_{w(G4+G5)}/(f_w \cdot f_t)^{1/2}$ is not larger than the lower limit, the angle of view cannot be enlarged though balance of the curvature of field with the spherical aberration is improved.

The formula (2) limits the refracting power of the third lens groups in order to enlarge the angle of view at the wide-side end. When $f_{G3}/(f_w \cdot f_t)^{1/2}$ is not smaller than the upper limit, the angle of view cannot be enlarged though aberrations are better compensated for. When $f_{G3}/(f_w \cdot f_t)^{1/2}$ is not larger than the lower limit, the image surface inclined toward the object at the wide-side end and at the same time, the outer diameter of the first lens group becomes larger to increase the size of the total zoom lens system though the angle of view is further enlarged at the wide-side end.

When at least one of the faces of the lens elements in the third lens group is an aspheric surface, the number of lens elements can be reduced, whereby the length of the total lens system can be reduced and the manufacturing cost can be lowered. Further aberrations, especially the spherical aberration, can be better compensated for.

When the fifth lens group consists of a lens element having a positive refracting power and a lens element having a negative refracting power, compensation for lateral chromatic aberration over the entire focal length range is facilitated.

DESCRIPTION OF THE PREFERRED EMBODIMENTS

Figure 1:
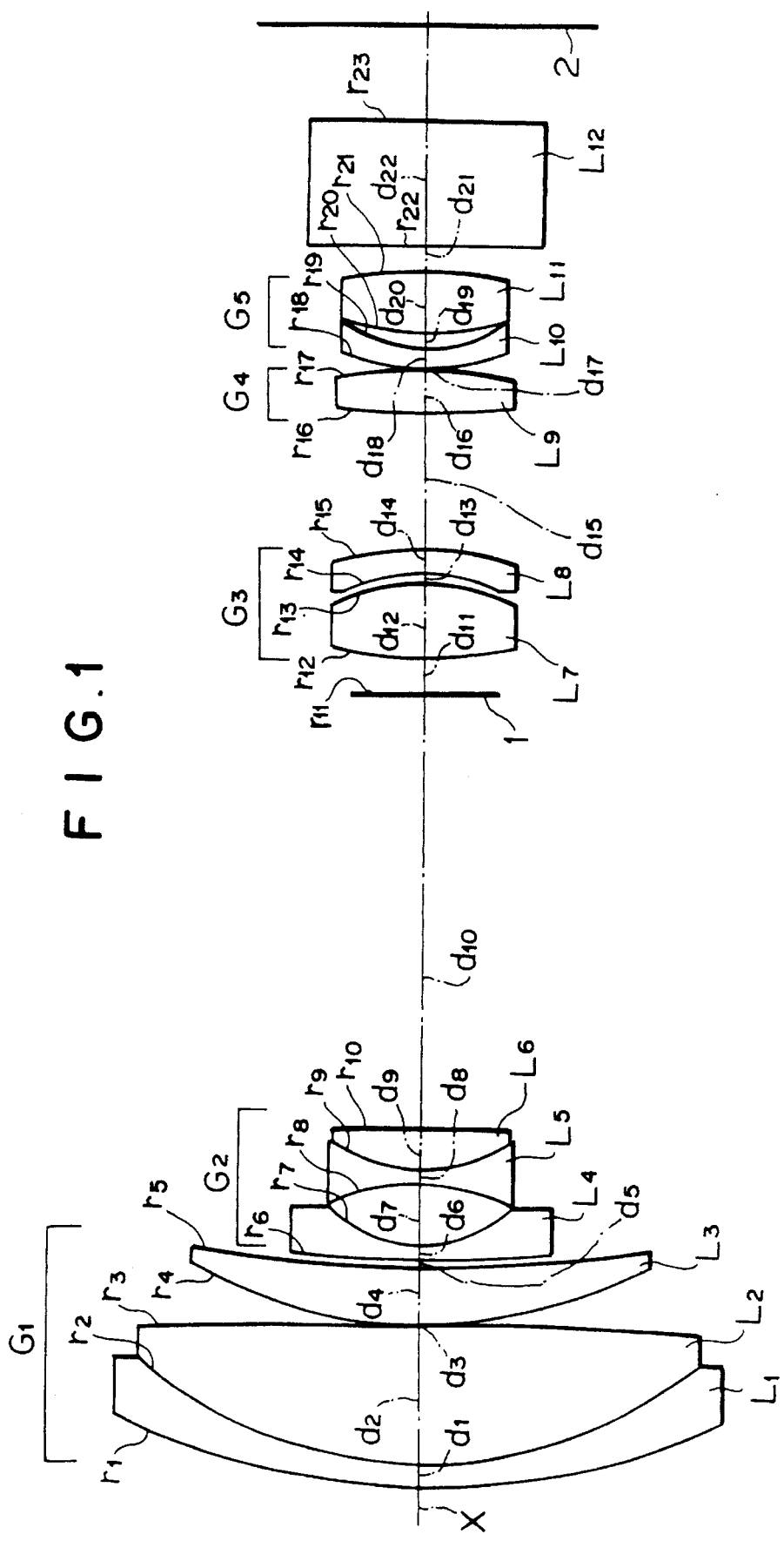
FIG. 1 is a view showing a basic arrangement of the lens elements in zoom lens systems in accordance with first to sixth embodiments of the present invention.
Figure 2A:
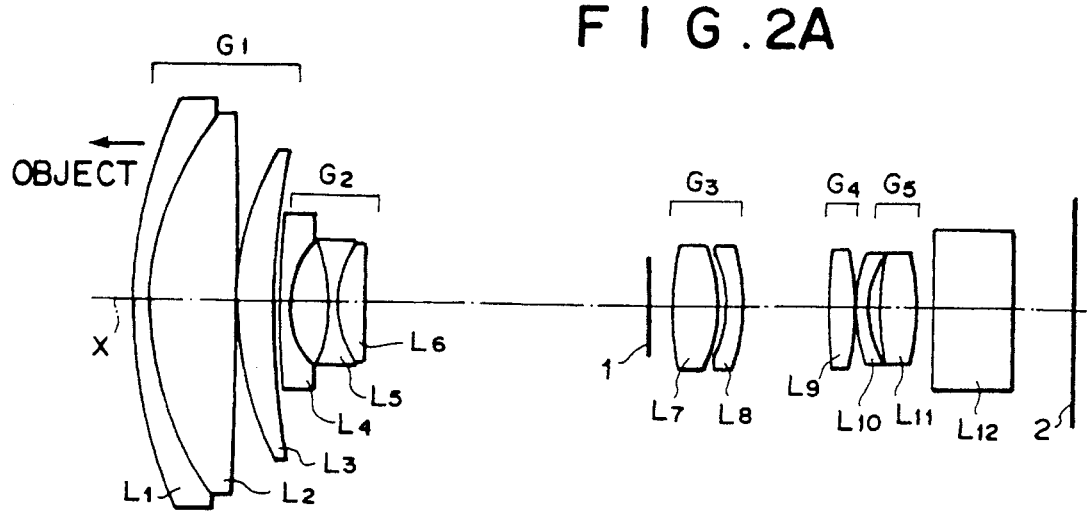
FIG. 2A is a view showing the positions of the respective lens groups in each of the zoom lens systems at the wide-side end.
Figure 2B:
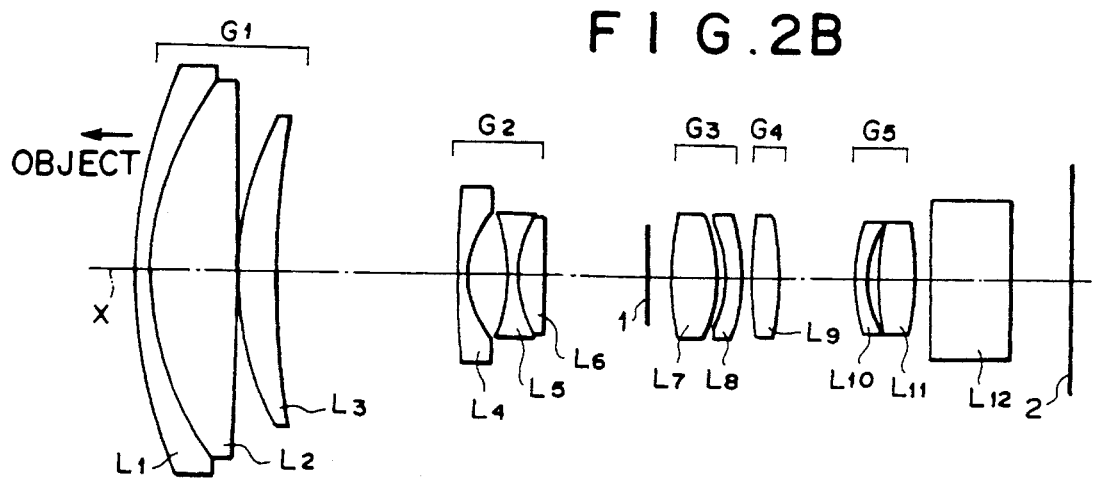
FIG. 2B is a view showing the positions of the respective lens groups in each of the zoom lens systems at a middle focal length.
Figure 2C:
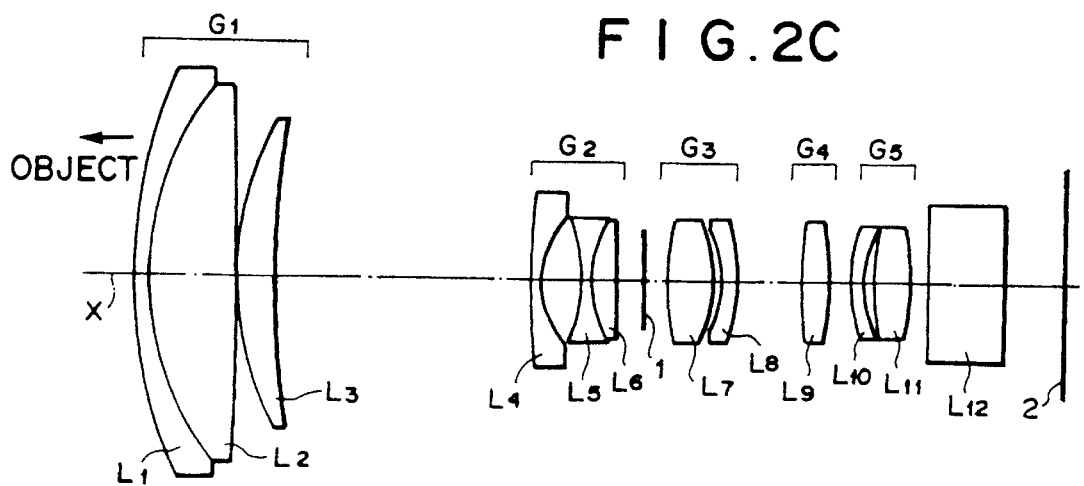
FIG. 2C is a view showing the positions of the respective lens groups in each of the zoom lens systems at the tele-side end, FIGS. 3A to 3C respectively show spherical aberration, astigmatism and distortion at the wide-side end of the zoom lens system in accordance with the first embodiment of the present invention, FIGS. 4A to 4C respectively show spherical aberration, astigmatism and distortion at the middle focal length of the zoom lens system in accordance with the first embodiment of the present invention, FIGS. 5A to 5C respectively show spherical aberration, astigmatism and distortion at the tele-side end of the zoom lens system in accordance with the first embodiment of the present invention, FIGS. 6A to 6C respectively show spherical aberration, astigmatism and distortion at the wide-side end of the zoom lens system in accordance with the second embodiment of the present invention, FIGS. 7A to 7C respectively show spherical aberration, astigmatism and distortion at the middle focal length of the zoom lens system in accordance with the second embodiment of the present invention, FIGS. 8A to 8C respectively show spherical aberration, astigmatism and distortion at the tele-side end of the zoom lens system in accordance with the second embodiment of the present invention, FIGS. 9A to 9C respectively show spherical aberration, astigmatism and distortion at the wide-side end of the zoom lens system in accordance with the third embodiment of the present invention, FIGS. 10A to 10C respectively show spherical aberration, astigmatism and distortion at the middle focal length of the zoom lens system in accordance with the third embodiment of the present invention, FIGS. 11A to 11C respectively show spherical aberration, astigmatism and distortion at the tele-side end of the zoom lens system in accordance with the third embodiment of the present invention, FIGS. 12A to 12C respectively show spherical aberration, astigmatism and distortion at the wide-side end of the zoom lens system in accordance with the fourth embodiment of the present invention, FIGS. 13A to 13C respectively show spherical aberration, astigmatism and distortion at the middle focal length of the zoom lens system in accordance with the fourth embodiment of the present invention, FIGS. 14A to 14C respectively show spherical aberration, astigmatism and distortion at the tele-side end of the zoom lens system in accordance with the fourth embodiment of the present invention, FIGS. 15A to 15C respectively show spherical aberration, astigmatism and distortion at the wide-side end of the zoom lens system in accordance with the fifth embodiment of the present invention, FIGS. 16A to 16C respectively show spherical aberration, astigmatism and distortion at the middle focal length of the zoom lens system in accordance with the fifth embodiment of the present invention, FIGS. 17A to 17C respectively show spherical aberration, astigmatism and distortion at the tele-side end of the zoom lens system in accordance with the fifth embodiment of the present invention, FIGS. 18A to 18C respectively show spherical aberration, astigmatism and distortion at the wide-side end of the zoom lens system in accordance with the sixth embodiment of the present invention, FIGS. 19A to 19C respectively show spherical aberration, astigmatism and distortion at the middle focal length of the zoom lens system in accordance with the sixth embodiment of the present invention, and FIGS. 20A to 20C respectively show spherical aberration, astigmatism and distortion at the tele-side end of the zoom lens system in accordance with the sixth embodiment of the present invention.

As shown in FIG. 1, each of zoom lens systems in accordance with first to sixth embodiments of the present invention comprises a positive first lens group G1, a negative second lens group G2, a stop 1, a positive third lens group G3, a positive fourth lens group G4 and a positive fifth lens group G5 arranged in this order from the object side. The second and fourth lens groups G2 and G4 are moved with the other lens groups G1, G3 and G5 fixed when zooming. The focal length of the total lens system is changed by moving the second lens group G2 in the direction of the optical axis X and the change in the image-forming position generated by the movement of the second lens group G2 is compensated for and the zoom lens system is focused by moving the fourth lens group G4 in the direction of the optical axis X. The positions of the lens groups relative to each other in each of the zoom lens systems at the wide-side end, at a middle focal length and at the tele-side end are shown in FIGS. 2A to 2C, respectively.

The following formulae (1) and (2) are satisfied, $$1.1 < f_{w(G4+G5)}/(f_w \cdot f_t)^{1/2} < 1.3 \quad (1)$$

$$1.2 < f_{G3}/(f_w \cdot f_t)^{1/2} < 1.8 \quad (2)$$

wherein $f_{w(G4+G5)}$ represents the combined focal length of the fourth and fifth lens groups G4 and G5 at the wide-side end, $f_w$ represents the focal length of the total lens system at the wide-side end, $f_t$ represents the focal length of the total lens system at the tele-side end and $f_{G3}$ represents the focal length of the third lens group G3.

The first lens group G1 consists of first to third lens elements $L_1$ to $L_3$, the second lens group G2 consists of fourth to sixth lens elements $L_4$ to $L_6$, the third lens group G3 consists of seventh and eighth lens elements $L_7$ and $L_8$, the fourth lens group G4 consists of a ninth lens element $L_9$ and the fifth lens group G5 consists of a tenth lens element $L_{10}$ having a positive refracting power and an eleventh lens element $L_{11}$ having a negative refracting power. The front face (the face facing the object side) of the seventh lens element $L_7$ is an aspheric surface. A low-pass filter $L_{12}$ which cuts infrared rays is disposed between the fifth lens group G5 and the image-forming plane 2.

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the first embodiment are shown in table 1.

The numbers in the leftmost column of table 1 designate the numbers of the symbols r, d, $N_d$ and $v_d$ as numbered from the object side and "aspheric" means that the face is an aspheric surface defined by the following formula (5). (the same for tables 3, 5, 7, 9, 11 described later)

$$Z = CY^2/\{1+(1-KC^2Y^2)^{1/2}\} + A_2Y^2 + A_3Y^6 + A_4Y^8 + A_5Y^{10} \quad (5)$$

wherein Z represents the length (mm) of a perpendicular line between a point on the aspheric surface at a height of Y above the optical axis and a plane tangent to the aspheric surface at the vertex thereof (a plane perpendicular to the optical axis), Y represents the height (mm) above the optical axis, C represents the curvature of the aspheric surface near the optical axis, K represents an eccentricity, and $A_2$ to $A_5$ respectively represents second-order, sixth-order, eighth-order and tenth-order aspheric coefficients.

TABLE 1

|  | r | d | $N_d$ | $v_d$ |
|---|---|---|---|---|
| 1 | 33.2254 | 0.9150 | 1.84666 | 23.8 |
| 2 | 19.7125 | 5.5240 | 1.63854 | 55.5 |
| 3 | −421.9114 | 0.0675 |  |  |
| 4 | 20.7000 | 2.3537 | 1.63854 | 55.5 |
| 5 | 59.6572 | variable |  |  |
| 6 | 74.0044 | 0.6150 | 1.72000 | 50.3 |
| 7 | 5.8566 | 2.4975 |  |  |
| 8 | −9.5886 | 0.5925 | 1.72000 | 50.3 |
| 9 | 6.7500 | 1.6575 | 1.80518 | 25.5 |
| 10 | 965.4929 | variable |  |  |
| 11 | stop | 1.4325 |  |  |
| 12 | aspheric | 3.0000 | 1.58913 | 61.2 |
| 13 | −9.1967 | 0.3825 |  |  |
| 14 | −7.6293 | 1.0125 | 1.84666 | 23.8 |
| 15 | −12.6911 | variable |  |  |
| 16 | 38.3474 | 1.7175 | 1.62041 | 60.3 |
| 17 | −21.1077 | variable |  |  |
| 18 | 10.6083 | 0.8025 | 1.80518 | 25.5 |
| 19 | 6.5606 | 0.6075 |  |  |
| 20 | 10.8495 | 2.4150 | 1.51633 | 64.1 |
| 21 | −19.9287 | 1.0000 |  |  |
| 22 | ∞ | 5.0000 | 1.51633 | 64.1 |
| 23 | ∞ |  |  |  |

Values of the focal length f, F-numbers $F_{NO}$ (at the wide-side end, the middle focal length and the tele-side end), the angle of view $2\omega$ of the total lens system, the constants C, K, $A_2$ to $A_5$ in formula (5), $f_{w(G4+G5)}/(f_w \cdot f_t)^{1/2}$ in formula (1) and $f_{G3}/(f_w \cdot f_t)^{1/2}$ in formula (2) are as follows.

| f = 3.50–40.69 | C = 0.059863 |
|---|---|
| $F_{NO}$ = 1.81; 2.3; 1.92 | $A_2 = 5.7276796 \times 10^{-5}$ |
| $2\omega$ = 69.9–5.9 | $A_3 = -2.6450717 \times 10^{-7}$ |
| $f_{w(G4+G5)}/(f_w \cdot f_t)^{1/2} = 1.17$ | $A_4 = 5.86211 \times 10^{-9}$ |
| $f_{G3}/(f_w \cdot f_t)^{1/2} = 1.51$ | $A_5 = 3.1308519 \times 10^{-13}$ |
|  | K = −3.7674274 |

The values of $d_5$, $d_{10}$, $d_{15}$ and $d_{17}$, which are variable, at the wide-side end (focal length $f_w$=3.5), the middle focal length (focal length $f_m$=15.59) and the tele-side end (focal length $f_t$=40.69) in the first embodiment

TABLE 2

|  | $d_5$ | $d_{10}$ | $d_{15}$ | $d_{17}$ |
|---|---|---|---|---|
| $f_w$ | 0.3380 | 27.6630 | 5.4620 | 0.1030 |
| $f_m$ | 11.5880 | 6.4130 | 0.6580 | 4.9060 |
| $f_t$ | 16.3380 | 1.6630 | 4.0570 | 1.5070 |

Spherical aberration, astigmatism and distortion of the zoom lens system of the first embodiment at the wide-side end are respectively shown in FIGS. 3A to 3C, those at the middle focal length are respectively shown in FIGS. 4A to 4C and those at the tele-side end are respectively shown in FIGS. 5A to 5C. As can be understood from FIGS. 3A to 3C, 4A to 4C and 5A to 5C, in the zoom lens system of the first embodiment, the aberrations are well compensated for over the entire focal length range. Further the angle of view is large (2ω=69.9°) and the zoom ratio is high (×11.6).

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the second embodiment are shown in table 3.

TABLE 3

| | r | d | $N_d$ | $\nu_d$ |
|---|---|---|---|---|
| 1 | 34.2901 | 0.9150 | 1.84666 | 23.8 |
| 2 | 18.0535 | 5.6606 | 1.63854 | 55.5 |
| 3 | −420.7228 | 0.0675 | | |
| 4 | 19.7702 | 2.1199 | 1.63854 | 55.5 |
| 5 | 82.5320 | variable | | |
| 6 | 112.7805 | 0.6150 | 1.72000 | 50.3 |
| 7 | 5.5515 | 2.4975 | | |
| 8 | −11.1398 | 0.5925 | 1.72000 | 50.3 |
| 9 | 6.7500 | 1.6575 | 1.80518 | 25.5 |
| 10 | 92.0808 | variable | | |
| 11 | stop | 1.4325 | | |
| 12 | aspheric | 3.0000 | 1.58913 | 61.2 |
| 13 | −9.1510 | 0.3825 | | |
| 14 | −7.9637 | 1.0125 | 1.84666 | 23.8 |
| 15 | −13.9909 | variable | | |
| 16 | 56.5500 | 1.7175 | 1.62041 | 60.3 |
| 17 | −20.8837 | variable | | |
| 18 | 9.5746 | 0.8025 | 1.80518 | 25.5 |
| 19 | 6.3503 | 0.6025 | | |
| 20 | 10.5494 | 2.4150 | 1.51633 | 64.1 |
| 21 | −17.2019 | 1.0000 | | |
| 22 | ∞ | 5.0000 | 1.51633 | 64.1 |
| 23 | ∞ | | | |

Values of the focal length f, F-numbers $F_{NO}$ (at the wide-side end, the middle focal length and the tele-side end), the angle of view 2ω of the total lens system, the constants C, K, $A_2$ to $A_5$ in formula (5), $f_{w(G4+G5)}/(f_w \cdot f_t)^{1/2}$ in formula (1) and $f_{G3}/(f_w \cdot f_t)^{1/2}$ in formula (2) are as follows.

| | |
|---|---|
| f = 3.31~36.94 | C = 0.057542 |
| $F_{NO}$ = 1.86; 2.32; 2.01 | $A_2$ = 3.0073040 × 10$^{-5}$ |
| 2ω = 71.1~6.5 | $A_3$ = −2.7391342 × 10$^{-7}$ |
| $f_{w(G4+G5)}/(f_w \cdot f_t)^{1/2}$ = 1.24 | $A_4$ = 5.8599429 × 10$^{-9}$ |
| $f_{G3}/(f_w \cdot f_t)^{1/2}$ = 1.71 | $A_5$ = 3.1263806 × 10$^{-13}$ |
| | K = −3.7799032 |

The values of $d_5$, $d_{10}$, $d_{15}$ and $d_{17}$, which are variable, at the wide-side end (focal length $f_w$=3.31), the middle focal length (focal length $f_m$=14.17) and the tele-side end (focal length $f_t$=36.94) in the second embodiment are as shown in the following table 4.

TABLE 4

| | $d_5$ | $d_{10}$ | $d_{15}$ | $d_{17}$ |
|---|---|---|---|---|
| $f_w$ | 0.3380 | 17.6630 | 6.9060 | 0.1050 |
| $f_m$ | 10.8380 | 7.1630 | 0.9810 | 6.0290 |
| $f_t$ | 15.3380 | 2.6630 | 4.4790 | 2.5310 |

Spherical aberration, astigmatism and distortion of the zoom lens system of the second embodiment at the wide-side end are respectively shown in FIGS. 6A to 6C, those at the middle focal length are respectively shown in FIGS. 7A to 7C and those at the tele-side end are respectively shown in FIGS. 8A to 8C. As can be understood from FIGS. 6A to 6C, 7A to 7C and 8A to 8C, in the zoom lens system of the second embodiment, the aberrations are well compensated for over the entire focal length range. Further the angle of view is large (2ω=71.1) and the zoom ratio is high (×11.2).

The radii of curvature r(mm) of the refracting surfaces, the axial surface separations d(mm) (the central thicknesses of the lenses or the air separations), and the refractive indexes $N_d$ and the Abbe's numbers $\nu_d$ of the lenses for the sodium d-line in the zoom lens system in accordance with the third embodiment are shown in table 5.

TABLE 5

| | r | d | $N_d$ | $\nu_d$ |
|---|---|---|---|---|
| 1 | 34.7507 | 0.9150 | 1.84666 | 23.8 |
| 2 | 18.7187 | 5.4124 | 1.63854 | 55.5 |
| 3 | −1066.4569 | 0.0675 | | |
| 4 | 19.2556 | 2.5985 | 1.63854 | 55.5 |
| 5 | 76.3671 | variable | | |
| 6 | 101.5753 | 0.6150 | 1.72000 | 50.3 |
| 7 | 5.7721 | 2.4975 | | |
| 8 | −9.8890 | 0.5925 | 1.72000 | 50.3 |
| 9 | 6.7500 | 1.6575 | 1.80518 | 25.5 |
| 10 | 449.6841 | variable | | |
| 11 | stop | 1.4325 | | |
| 12 | aspheric | 3.0000 | 1.58913 | 61.2 |
| 13 | −9.2595 | 0.3825 | | |
| 14 | −7.6878 | 1.0125 | 1.84666 | 23.8 |
| 15 | −12.7236 | variable | | |
| 16 | 43.2117 | 1.7175 | 1.62041 | 60.3 |
| 17 | −21.8256 | variable | | |
| 18 | 10.7237 | 0.8025 | 1.80518 | 25.5 |
| 19 | 6.6645 | 0.6025 | | |
| 20 | 11.1632 | 2.4150 | 1.51633 | 64.1 |
| 21 | −19.4790 | 1.0000 | | |
| 22 | ∞ | 5.0000 | 1.51633 | 64.1 |
| 23 | ∞ | | | |

Values of the focal length f, F-numbers $F_{NO}$ (at the wide-side end, the middle focal length and the tele-side end), the angle of view 2ω of the total lens system, the constants C, K, $A_2$ to $A_5$ in formula (5), $f_{2(G4+G5)}/(f_w \cdot f_t)^{1/2}$ in formula (1) and $f_{G3}/(f_w \cdot f_t)^{1/2}$ in formula (2) are as follows.

| | |
|---|---|
| f = 3.51~38.46 | C = 0.062335 |
| $F_{NO}$ = 1.83; 2.27; 1.88 | $A_2$ = 6.0951726 × 10$^{-5}$ |
| 2ω = 70.1~6.3 | $A_3$ = −2.6395884 × 10$^{-7}$ |
| $f_{w(G4+G5)}/(f_w \cdot f_t)^{1/2}$ = 1.24 | $A_4$ = 5.8622639 × 10$^{-9}$ |
| $f_{G3}/(f_w \cdot f_t)^{1/2}$ = 1.51 | $A_5$ = 3.1312991 × 10$^{-13}$ |
| | K = −3.7655239 |

The values of $d_5$, $d_{10}$, $d_{15}$ and $d_{17}$, which are variable, at the wide-side end (focal length $f_w$=3.51), the middle focal length (focal length $f_m$=14.7) and the tele-side end (focal length $f_t$=38.46) in the third embodiment are as shown in the following table 6.

TABLE 6

| | $d_5$ | $d_{10}$ | $d_{15}$ | $d_{17}$ |
|---|---|---|---|---|
| $f_w$ | 0.3380 | 17.6630 | 5.0870 | 0.1030 |
| $f_m$ | 10.8380 | 7.1630 | 0.6650 | 4.5260 |
| $f_t$ | 15.3380 | 2.6630 | 4.3110 | 0.8790 |

Spherical aberration, astigmatism and distortion of the zoom lens system of the third embodiment at the wide-side end are respectively shown in FIGS. 9A to 9C, those at the middle focal length are respectively shown in FIGS. 10A to 10C and those at the tele-side end are respectively shown in FIGS. 11A to 11C. As can be understood from FIGS. 9A to 9C, 10A to 10C and 11A to 11C, in the zoom lens system of the third embodiment, the aberrations are well compensated for over the entire focal length range. Further the angle of view is large (2ω=70.1°) and the zoom ratio is high (×11.0).

The radii of curvature r(mm) of the refracting surfaces, the axial surface separations d(mm) (the central thicknesses of the lenses or the air separations), and the refractive indexes $N_d$ and the Abbe's numbers $\nu_d$ of the lenses for the sodium d-line in the zoom lens system in accordance with the fourth embodiment are shown in table 7.

TABLE 7

| | r | d | $N_d$ | $v_d$ |
|---|---|---|---|---|
| 1 | 33.1131 | 0.9150 | 1.84666 | 23.8 |
| 2 | 19.0845 | 5.3875 | 1.63854 | 55.5 |
| 3 | ∞ | 0.2000 | | |
| 4 | 19.9846 | 3.2075 | 1.63854 | 55.5 |
| 5 | 68.3603 | variable | | |
| 6 | 87.8839 | 0.6150 | 1.720000 | 50.3 |
| 7 | 5.8802 | 2.4975 | | |
| 8 | −10.1864 | 0.5925 | 1.72000 | 50.3 |
| 9 | 6.7500 | 1.6575 | 1.80518 | 25.5 |
| 10 | 260.5489 | variable | | |
| 11 | stop | 1.0000 | | |
| 12 | aspheric | 3.0000 | 1.58913 | 61.2 |
| 13 | −9.8073 | 0.3825 | | |
| 14 | −7.9199 | 1.0125 | 1.84666 | 23.8 |
| 15 | −12.7164 | variable | | |
| 16 | 40.7523 | 1.7175 | 1.62041 | 60.3 |
| 17 | −19.4613 | variable | | |
| 18 | 10.6597 | 0.8025 | 1.80518 | 25.5 |
| 19 | 6.6582 | 0.6025 | | |
| 20 | 12.4254 | 2.4150 | 1.51633 | 64.1 |
| 21 | −20.7265 | 1.0000 | | |
| 22 | ∞ | 5.0000 | 1.51633 | 64.1 |
| 23 | ∞ | | | |

Values of the focal length f, F-numbers $F_{NO}$ (at the wide-side end, the middle focal length and the tele-side end), the angle of view 2ω of the total lens system, the constants C, K, $A_2$ to $A_5$ in formula (5), $f_{w(G4+G5)}/(f_w \cdot f_t)^{1/2+cc}$ in formula (1) and $f_{G3}/(f_w \cdot f_t)^{+c,fra~1/2}$ in formula (2) are as follows.

```
f = 3.81–41.43                C = 0.065453
F_NO = 1.84; 2.25; 1.84       A_2 = 3.331923 × 10^−5
2ω = 64.5–5.8                 A_3 = −2.6663884 × 10^−7
f_w(G4+G5)/(f_w · f_t)^1/2 = 1.22    A_4 = 5.8622983 × 10^−9
f_G3/(f_w · f_t)^1/2 = 1.36   A5 = 3.1321873 × 10^−13
                              K = −3.7807076
```

The values of $d_5$, $d_{10}$, $d_{15}$ and $d_{17}$, which are variable, at the wide-side end (focal length $f_w$,3.81), the middle focal length (focal length $f_m$=16.17) and the tele-side end (focal length $f_t$=41.43) in the fourth embodiment are as shown in the following table 8.

TABLE 8

| | $d_5$ | $d_{10}$ | $d_{15}$ | $d_{17}$ |
|---|---|---|---|---|
| $f_w$ | 0.5000 | 17.0000 | 4.2080 | 0.1030 |
| $f_m$ | 11.0000 | 6.5000 | 0.3990 | 3.9130 |
| $f_t$ | 15.5000 | 2.0000 | 4.4070 | 0.1000 |

Spherical aberration, astigmatism and distortion of the zoom lens system of the fourth embodiment at the wide-side end are respectively shown in FIGS. 12A to 2C, those at the middle focal length are respectively shown in FIGS. 13A to 13C and those at the tele-side end are respectively shown in FIGS. 14A to 14C. As can be understood from FIGS. 12A to 12C, 13A to 13C and 14A to 14C, in the zoom lens system of the fourth embodiment, the aberrations are well compensated for over the entire focal length range. Further the angle of view is large (2ω=64.5°) and the zoom ratio is high (×10.9).

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the fifth embodiment are shown in table 9.

TABLE 9

| | r | d | $N_d$ | $v_d$ |
|---|---|---|---|---|
| 1 | 32.6520 | 0.9150 | 1.84666 | 23.8 |
| 2 | 19.4208 | 6.0414 | 1.63854 | 55.5 |
| 3 | −1248.3624 | 0.2000 | | |
| 4 | 20.9805 | 3.6357 | 1.63854 | 55.5 |
| 5 | 63.6048 | variable | | |
| 6 | 80.1773 | 0.6150 | 1.72000 | 50.3 |
| 7 | 6.1184 | 2.4975 | | |
| 8 | −10.0706 | 0.5925 | 1.72000 | 50.3 |
| 9 | 6.7500 | 2.0000 | 1.80518 | 25.5 |
| 10 | 98.2335 | variable | | |
| 11 | stop | 1.0000 | | |
| 12 | aspheric | 3.0000 | 1.58913 | 61.2 |
| 13 | −9.6723 | 0.3825 | | |
| 14 | −8.1067 | 1.0125 | 1.84666 | 23.8 |
| 15 | −12.8794 | variable | | |
| 16 | 43.7890 | 1.7175 | 1.62041 | 60.3 |
| 17 | −21.5495 | variable | | |
| 18 | 10.7743 | 0.8025 | 1.80518 | 25.5 |
| 19 | 6.6873 | 0.6025 | | |
| 20 | 12.2002 | 2.4150 | 1.51633 | 64.1 |
| 21 | −19.2098 | 1.0000 | | |
| 22 | ∞ | 5.0000 | 1.51633 | 64.1 |
| 23 | ∞ | | | |

Values of the focal length f, F-numbers $F_{NO}$ (at the wide-side end, the middle focal length and the tele-side end), the angle of view 2ω of the total lens system, the constants C, K, $A_2$ to $A_5$ in formula (5), $f_{w(G4+G5)}/(f_w \cdot f_t)^{1/2}$ formula (1) and $f_{G3}/(f_w \cdot f_t)^{1/2}$ in formula (2) are as follows.

```
f = 4.0–43.67                  C = 0.064733
F_NO = 1.84; 2.31; 1.86        A_2 = 2.218015 × 10^−5
2ω = 61.5–5.5                  A_3 = −2.6421953 × 10^−7
f_w(G4+G5)/(f_w · f_t)^1/2 = 1.15    A_4 = 5.8634288 × 10^−9
f_G3/(f_w · f_t)^1/2 = 1.26    A5 = 3.1351325 × 10^−13
                               K = −3.7910103
```

The values of $d_5$, $d_{10}$, $d_{15}$ and $d_{17}$, which are variable, at the wide-side end (focal length $f_w$=4.0), the middle focal length (focal length $f_m$=17.03) and the tele-side end (focal length $f_t$=43.67) in the fifth embodiment are as shown in the following table 10.

TABLE 10

| | $d_5$ | $d_{10}$ | $d_{15}$ | $d_{17}$ |
|---|---|---|---|---|
| $f_w$ | 0.5000 | 17.0000 | 5.1030 | 0.1060 |
| $f_m$ | 11.0000 | 6.5000 | 0.5710 | 4.6380 |
| $f_t$ | 15.5000 | 2.0000 | 4.7200 | 0.4890 |

Spherical aberration, astigmatism and distortion of the zoom lens system of the fifth embodiment at the wide-side end are respectively shown in FIGS. 15A to 15C, those at the middle focal length are respectively shown in FIGS. 16A to 16C and those at the tele-side end are respectively shown in FIGS. 17A to 17C. As can be understood from FIGS. 15A to 15C, 16A to 16C and 17A to 17C, in the zoom lens system of the fifth embodiment, the aberrations are well compensated for over the entire focal length range. Further the angle of view is large (2ω=61.5°) and the zoom ratio is high (×10.9).

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the sixth embodiment are shown in table 11.

TABLE 11

|   | r | d | $N_d$ | $v_d$ |
|---|---|---|---|---|
| 1 | 34.6363 | 0.9150 | 1.84666 | 23.8 |
| 2 | 19.6247 | 5.3190 | 1.63854 | 55.5 |
| 3 | −458.2127 | 0.0675 | | |
| 4 | 20.4176 | 2.4687 | 1.63854 | 55.5 |
| 5 | 66.4406 | variable | | |
| 6 | 84.7363 | 0.6150 | 1.72000 | 50.3 |
| 7 | 5.8535 | 2.4975 | | |
| 8 | −9.7078 | 0.5925 | 1.72000 | 50.3 |
| 9 | 6.7500 | 1.6575 | 1.80518 | 25.5 |
| 10 | 3811.8043 | variable | | |
| 11 | stop | 1.4325 | | |
| 12 | aspheric | 3.0000 | 1.58913 | 61.2 |
| 13 | −9.1847 | 0.3825 | | |
| 14 | −7.6104 | 1.0125 | 1.84666 | 23.8 |
| 15 | −12.8442 | variable | | |
| 16 | 37.4579 | 1.7175 | 1.62041 | 60.3 |
| 17 | −20.7303 | variable | | |
| 18 | 10.6997 | 0.8025 | 1.80610 | 33.3 |
| 19 | 6.5660 | 0.6075 | | |
| 20 | 10.9574 | 2.4150 | 1.51823 | 59.0 |
| 21 | −20.0065 | 1.0000 | | |
| 22 | ∞ | 5.0000 | 1.51633 | 64.1 |
| 23 | ∞ | | | |

Values of the focal length f, F-numbers $F_{NO}$ (at the wide-side end, the middle focal length and the tele-side end), the angle of view $2\omega$ of the total lens system, the constants C, K, $A_2$ to $A_5$ in formula (5), $f_{w(G4+G5)}/(f_w \cdot f_t)^{1/2}$ in formula (1) and $f_{G3}/(f_w \cdot f_t)^{1/2}$ in formula (2) are as follows.

| | |
|---|---|
| f = 3.50–40.76 | C = 0.060381 |
| $F_{NO}$ = 1.82; 2.3; 1.92 | $A_2$ = 5.6962640 × 10$^{-5}$ |
| $2\omega$ = 69.9–5.9 | $A_3$ = −2.6435267 × 10$^{-7}$ |
| $f_{w(G4+G5)}/(f_w \cdot f_t)^{1/2}$ = 1.29 | $A_4$ = 5.86219 × 10$^{-9}$ |
| $f_{G3}/(f_w \cdot f_t)^{1/2}$ = 1.52 | A5 = 3.1310915 × 10$^{-13}$ |
| | K = −3.7676626 |

The values of $d_5$, $d_{10}$, $d_{15}$ and $d_{17}$, which are variable, at the wide-side end (focal length $f_w$3.5), the middle focal length (focal length $f_m$=15.59) and the tele-side end (focal length $f_t$=40.76) in the sixth embodiment are as shown in the following table 12.

TABLE 12

|   | $d_5$ | $d_{10}$ | $d_{15}$ | $d_{17}$ |
|---|---|---|---|---|
| $f_w$ | 0.3380 | 17.6630 | 5.3790 | 0.1020 |
| $f_m$ | 11.5880 | 6.4130 | 0.7410 | 4.7400 |
| $f_t$ | 16.3380 | 1.6630 | 4.3230 | 1.1580 |

Spherical aberration, astigmatism and distortion of the zoom lens system of the sixth embodiment at the wide-side end are respectively shown in FIGS. 18A to 18C, those at the middle focal length are respectively shown in FIGS. 19A to 19C and those at the tele-side end are respectively shown in FIGS. 20A to 20C. As can be understood from FIGS. 18A to 18C, 19A to 19C and 20A to 20C, in the zoom lens system of the sixth embodiment, the aberrations are well compensated for over the entire focal length range. Further the angle of view is large ($2\omega$=69.9°) and the zoom ratio is high (×11.6).

The values of the angle of views ($2\omega$) described above sometimes differ from the values obtained by doubling the values of $\omega$ written in the drawings due to round-off errors.

The arrangement of the zoom lens system in accordance with the present invention need not be limited to those described above in conjunction with the first to sixth embodiments but may be variously modified without departing from the spirit and scope of the invention.

What is claimed is:

1. A zoom lens system arranged along an optical axis between an object side and an image-forming side to form an image at an image-forming position on the image-forming side, comprising: a first lens group G1 having a positive refracting power, a second lens group G2 having a negative refracting power, a stop, a third lens group G3 having a positive refracting power, a fourth lens group G4 having a positive refracting power and a fifth lens group G5 having a positive refracting power arranged in this order from the object side, the second and fourth lens groups G2 and G4 being moved with the other lens groups G1, G3 and G5 fixed when zooming, the second lens group G2 being moved along said optical axis to change focal length of said zoom lens system, the fourth lens group G4 being moved to correct the image-forming position, the following formulae (1) and (2) being satisfied, $$1.1 < f_{w(G4+G5)}/(f_w \cdot f_t)^{1/2} 1.3 \quad (1)$$

$$1.2 < f_{G3}(f_w \cdot f_t)^{1/2} < 1.8 \quad (2)$$

wherein $F_{w(G4+G5)}$ represents combined focal length of the fourth and fifth lens groups G4 and G5 at the wide-side end, $f_w$ represents focal length of said zoom lens system at the wide-side end, $f_t$ represents focal length of said zoom lens system at the tele-side end and $f_{G3}$ represents focal length of the third lens group G3.

2. The zoom lens system of claim 1 in which at least one face of a lens element in the third lens group G3 is an aspheric surface.

3. The zoom lens system of claim 1 or 2 in which said fifth lens group G5 consists of a lens element having a positive refracting power and a lens element having a negative refracting power.

4. The zoom lens system of claim 3 in which an Abbe's number v+ of the lens element of group G5 having a positive refracting power and an Abbe's number v− of the lens element of group G5 having a negative refracting power satisfy the formulae v+>55 and v−<35.

* * * * *